(No Model.)
T. H. BOYER.
WATER FILTER.
No. 554,858. Patented Feb. 18, 1896.
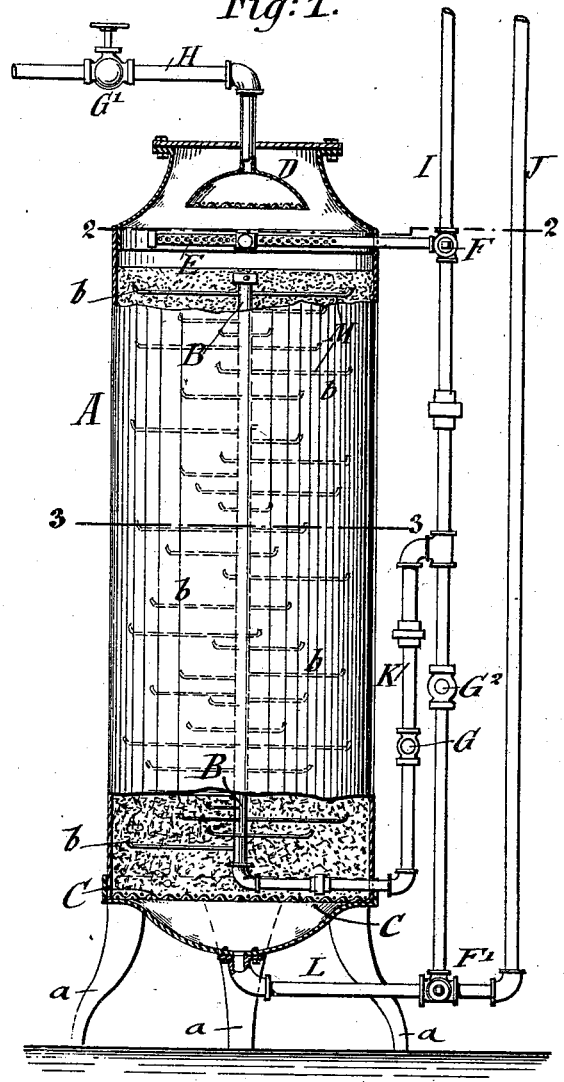
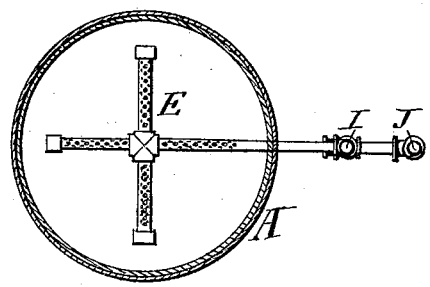
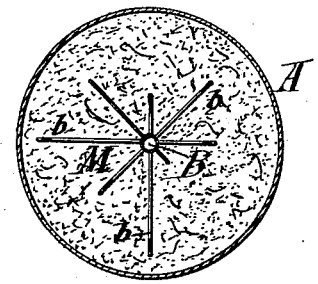
WITNESSES:
INVENTOR
Tilghman H. Boyer
BY
ATTORNEYS.

UNITED STATES PATENT OFFICE.

TILGHMAN H. BOYER, OF ALLENTOWN, PENNSYLVANIA.

WATER-FILTER.

SPECIFICATION forming part of Letters Patent No. 554,858, dated February 18, 1896.

Application filed September 26, 1895. Serial No. 563,786. (No model.)

*To all whom it may concern:*

Be it known that I, TILGHMAN H. BOYER, a citizen of the United States, residing at Allentown, in the county of Lehigh and State of Pennsylvania, have invented certain new and useful Improvements in Water-Filters, of which the following is a specification.

This invention relates to an improved water-filter in which the filtering material can be readily washed whenever accumulations of sediments and dirt are collected in the same by means of jets of water which are passed through the filtering material in a direction opposite to that of the water to be filtered, so that the filtering material is agitated throughout its entire body and thoroughly cleaned from all adhering impurities; and the invention consists of a water-filter which comprises a closed cylindrical tank in which a suitable filtering material is placed, a perforated supply-pipe for the water to be filtered, arranged at the upper part of the tank, a screen at the lower part of the tank on which the filtering material is supported, and a central water-distributing pipe having a number of laterally-extending branches of varying lengths and open at their ends for discharging the cleaning-water and loosening and cleaning the filtering material, the water being supplied to the central distributing-pipe by a valved branch supply-pipe and conducted off through a screened outlet-pipe arranged at the upper end of the tank, as will be more fully described hereinafter, and finally pointed out in the claim.

In the accompanying drawings, Figure 1 represents a side elevation of my improved water-filter, partly in section, through the upper and lower parts of the same; and Figs. 2 and 3 are horizontal sections, respectively, on lines 2 2 and 3 3, Fig. 1.

Similar letters of reference indicate corresponding parts.

Referring to the drawings, A represents a cylindrical tank which is made of sheet metal of suitable thickness, closed at the bottom and top and supported on suitable legs *a a*.

The bottom of the tank A is made concavo-convex and connected by a short pipe L with the service-pipe J. A screen C is arranged at the lower part of the tank A on which the filtering material is supported, which is preferably of animal charcoal (bone-black) or any other suitable filtering material. The water to be filtered is supplied by a perforated pipe E, which is located in the upper part of the tank and preferably made in the shape of a cross, so as to supply the water in small jets to the top of the body of filtering material in the tank A.

The cross-shaped supply-pipe E is connected with the main supply-pipe I by a three-way cock F, said supply-pipe being contained below the cock F down to the pipe L with which it is likewise connected by a three-way cock F', as shown in Fig. 1. The water passes from the perforated supply-pipe E in downward direction through the filtering material and through the screen at the bottom of the tank to the concavo-convex bottom of the same, from which it is conducted by the pipe L and the service-pipe J to the place of use.

It is necessary from time to time to clean the filtering material from the dirt and sediment that have accumulated in the same, and for this purpose a distributing-pipe B is arranged in the center of the tank, which pipe is connected at its lower end, above the screen C, by a pipe K, provided with a stop-cock G, with the supply-pipe I at a point intermediately between the upper and lower three-way cocks, F F'. The central distributing-pipe, B, is closed at its upper end and provided with a large number of radiating branch pipes *b* of varying lengths which are bent up and left open at their outer ends, so that the water is supplied in a number of small jets throughout the body of the filtering material whenever the same is to be cleaned.

Before the stop-cock G of the pipe K for supplying the water for cleaning the filtering material is opened the three-way cock F of the supply-pipe I is turned, so that the connection of the supply-pipe I with the cross-pipe E is interrupted and the connection of the supply-pipe I with the pipe K established. The water that is emitted through the distributing branch pipes *b* agitates the entire body of filtering material, washes out the dirt and sediments in the same, and carries them along to an outlet-pipe H which is arranged in the top of the tank and provided with a stop-cock G' at its outer part.

At the inner end of the outlet-pipe H is arranged an enlarged cup or bell-shaped portion D, which is provided with a wire screen. This enlarged portion D serves for facilitating the passage of the cleaning water through the outlet-pipe H to the outside of the tank. The cleaning water is tested from time to time until it runs perfectly clear, which indicates that the filtering material has been cleaned entirely of the impurities accumulated in the same.

When the cleaning of the filtering material is accomplished, the stop-cock G of the lower supply-pipe, K, is closed again and the three-way cock F turned again, so that the connection of the main supply-pipe I with the cross-shaped supply-pipe E is established, after which the regular filtering action of the water takes place as before.

Between the three-way cocks F F' and below the junction of the supply-pipe K with the pipe I is arranged an additional stop-cock $G^2$, which serves for the purpose of preventing the water from passing to the service-pipe J, while the filtering material is cleaned by the water supplied to the tank by the branch pipe K. By closing the stop-cock G, opening stop-cock $G^2$, and setting the three-way cocks F and F' into such a position that the connection of the supply-pipe I with the filtering-tank A is discontinued the water in unfiltered condition can be supplied to the service-pipe, which is necessary when the filter is cut out for repairs or for replacing a new body for filtering material in the same.

The filter is adapted for cleaning the water supplied to private residences, the feed-water of steam-boilers, and for all other purposes in which a good and effective water-filter is required, it being made up in proper sizes corresponding to the purpose for which the filter is to be used.

Having thus described my invention, I claim as new and desire to secure by Letters Patent—

In a filter, the combination, with a closed tank, provided with a body of filtering material in the same, of a perforated supply-pipe at the upper part of the tank, a discharge-pipe in the bottom of the same, a service-pipe connected with said discharge-pipe, a main supply-pipe connected with the perforated supply-pipe and with the discharge-pipe, three-way cocks at the points of connection of the main supply-pipe with the perforated supply-pipe and the discharge-pipe, a vertical central distributing-pipe in said tank provided with a number of radial branch pipes of varying lengths open at their outer ends, and a branch supply-pipe connecting the main supply-pipe with the lower end of said central pipe, and an outlet-pipe at the top of the tank, substantially as set forth.

In testimony that I claim the foregoing as my invention I have signed my name in presence of two subscribing witnesses.

TILGHMAN H. BOYER.

Witnesses:
PAUL GOEPEL,
GEORGE W. JAEKEL.